United States Patent [19]

Washam

[11] 4,117,170

[45] Sep. 26, 1978

[54] SULFUR AS AN ANOREXIGENIC AGENT

[75] Inventor: Ray D. Washam, Arnold, Mo.

[73] Assignee: Ralston Purina Company, St. Louis, Mo.

[21] Appl. No.: 489,972

[22] Filed: Jul. 19, 1974

[51] Int. Cl.² .................. A23K 1/10; A23K 1/175
[52] U.S. Cl. ................................ 426/72; 426/623; 426/73; 426/641
[58] Field of Search ............... 426/2, 74, 218, 220, 426/71, 648, 807, 72, 641, 657, 73, 623; 424/162

[56] References Cited

U.S. PATENT DOCUMENTS

| 233,083 | 10/1880 | Emerick | 424/162 |
| 826,990 | 7/1906 | Cartwright | 426/807 |
| 1,645,703 | 10/1927 | Lapp | 426/220 |
| 3,669,676 | 6/1972 | Karr et al. | 426/807 |

OTHER PUBLICATIONS

Chemical Abstracts, vol. 28, 1934, 5548, "Compounding Feeds with Inorganic Products."

*Primary Examiner*—Hiram H. Bernstein
*Attorney, Agent, or Firm*—W. Dennis Drehkoff; Veo Peoples, Jr.

[57] ABSTRACT

Effective amounts of sulfur in swine feeds will limit feed intake. More particularly, the use of at least about 0.25% sulfur in the feed will negate the need for hand feeding and will accordingly allow the swine to be self-fed.

6 Claims, No Drawings

SULFUR AS AN ANOREXIGENIC AGENT

BACKGROUND OF THE INVENTION

Generally, this invention relates to the use of sulfur as an anorexigenic agent more frequently referred to as an appetite depressant, or sometimes called a feed intake limiter.

Although there is not much difference in the ability of swine and ruminants to digest feed concentrates that are not high in fiber, the great difference in the swine's digestive tract does require qualitative distinction in their feed and feed supplements. For example, swine are not able to make much use of fibrous materials such as roughage, nor are swine able to make much use of many minerals conventional in the feed of ruminants, including sulfur. Differing from cattle, sheep, or horses, swine need a high quality protein since there is little synthesis of good quality protein in their digestive tracts such as occurs in the rumen of cattle and sheep and in the caecum and large intestine of horses. Swine also grow more rapidly than ruminants and they produce their young at an earlier age. Accordingly, swine requirements for protein (amino acids), certain minerals, and vitamins are generally at a higher level. For these reasons, inter alia, swine feeds and ruminant feeds are not interchangeable.

Although elemental sulfur has been utilized in ruminant feeds for nutritional purposes (see U.S. Pat. No. 3,600,189) and in extruded food products as described in U.S. Pat. No. 3,496,858, it has generally not been utilized in swine feeds for any purpose. The primary reason for avoiding the use of added elemental sulfur in swine feeds was that the digestive tract of swine, unlike that of ruminants, was not believed capable of advantageously assimilating the sulfur either nutritionally or for any other desirable purpose.

Self-feeding of swine is often very desirable from the standpoint of economics, as well as convenience. "Self-feeding" means that the swine are offered a feed on a free-choice basis without periodic feeding of a rationed amount by a hog producer each day. A disadvantage, however, of allowing swine to self-feed is that they tend to over-eat and consequently get a higher intake of feed than is completely necessary for proper weight gain or weight maintenance. This problem is particularly acute with respect to sows or gilts during gestation, because improper weight maintenance which ordinarily occurs during self-feeding imparts an injurious effect upon the female pig's reproductive performance. Additionally, if finished hogs, ready for market, are at that time overweight, many markets will discount the price of the hog per pound of excessive fat.

Accordingly, for such applications, farmers or ranchers have had to resort to hand feeding the swine, even though such manual labor is inconvenient, time consuming, and expensive. However, since the use of elemental sulfur will inhibit the intake of swine so as to preclude this cumbersome hand feeding and allow an effective self-feeding, the present invention will fulfill a long felt need in the industry and will provide an unexpected yet substantial advancement in the art.

SUMMARY OF THE INVENTION

The present invention is directed toward a method of controlling feed intake of swine by use of an effective amount of sulfur, and toward a ready-to-eat ration for swine which allows them to feed on a free choice basis without danger of overeating, and toward a method of making such ration.

It is an object of the present invention to provide a feed intake limiter for swine which would preclude the need for hand feeding during such times as the gestation period and a period just prior to marketing.

These objects and others, which will be more apparent from the following description of preferred embodiments, are fulfilled by the inclusion of elemental sulfur into the diets of these animals.

DESCRIPTION OF THE PREFERRED EMBODIMENTS

Generally, the controlled feeding of swine is critical. The reason for this is twofold. First, when swine are inadequately fed, they are apt to suffer from severe nutritive deficiencies much more frequently than are cattle, sheep or horses. So they must be fed at least a nutritive minimum. Second, on the other hand is the fact that swine have a greater capacity to consume feed in proportion to their live weight than do for example, ruminants. Because of this factor and also because of a greater efficiency in the utilization of food nutrients, they make much more rapid weight gains in proportion to their live weights. Well fed pigs for example make more than twice as great a gain per 100 pounds live weight from weaning time to market weights as do fattening calves, and three times as much as is made by fattening lambs. Accordingly, swine must not be allowed to exceed a certain maximum intake.

The feed intake limiting composition of the present invention consists of elemental sulfur and ordinary swine feed ingredients.

The principle raw material of the present invention is elemental sulfur. In every state, whether gas, liquid or solid, elemental sulfur occurs in more than one allotropic form or modification. Even amorphous or "plastic" sulfur can be obtained by fast cooling of the crystalline form. Nine isotopic forms of sulfur exist, four of which occur in natural sulfur. Although, these present a confusing multitude of forms whose precise mechanism is anorexigenic functionality is not yet fully understood, the present invention is not limited to any particular form. Likewise, although sulfur is available in purities of 99.999+%, the purity of the sulfur is in no way a limitation to this invention. The sulfur may be used in its naturally occurring state, in its commercially available state, or it may be used in conjunction with a carrier such as cellulose or other material, essentially nonreactive with the sulfur. However, it is especially preferred in the practice of the present invention for purposes of economy and convenience to use a finely divided powdery form of sulfur, known as "flowers of sulfur", which is obtained by sublimation of sulfur gases during sulfur manufacture and is available at 99.5% purity.

Other raw materials of the present invention are the feed materials and/or feed supplements essential for proper nutrition of swine. The particular protein, mineral and vitamin requirements for swine may vary depending on the class of swine, e.g., brood sow, gilt, young pig, boar, but in most cases these requirements will be provided by feeds composed chiefly of grain, e.g., corn, wheat, milo, barley, sorghum, etc. In addition it is exceedingly important from a nutritional standpoint to provide swine with certain feed supplements that are rich in protein (amino acids), calcium, vitamin B complex, and vitamin D and thereby help correct the nutrient deficiencies of the cereal grains. Examples of sources of protein supplement are soybean oil meal, meat scraps, fish meal, etc. Mineral and vitamin supplements and even milk may also be employed. Additionally, swine can utilize food which might otherwise be wasted such as garbage and garden waste. The overall ration may be fed in the form of, for example, a simple mixture, in meal form or in pelleted form, whichever is desired.

The general content of dry matter such as digestable protein, digestible nutrients, calcium, phosphorous and, for example, carotene in a swine ration per head daily for various classes of swine are stated in Appendix Table III of *Feeds and Feeding,* 22nd Edition by Frank B. Morrison published in 1956. However, variation in these rations are permitted if desired.

In accordance with the present invention the composition herein discovered has been found to control the feed intake of swine to a predetermined amount by virtue of an amount of elemental sulfur which renders the feed undesirable in taste, odor or otherwise effective manner to limit consumption or intake to the minimum predetermined amount. Although most swine feeds inherently contain some sulfur, the maximum amount so contained is ordinarily 0.15% by weight of the other ingredients in the feed. However, an effective amount of elemental sulfur for controlling feed intake is generally at least about 0.25% by weight of the other ingredients in the feed. Accordingly, any amount of sulfur present in the feed in excess of about 0.25% will effect an intake limiting limiting function for most swine feeds. The greater the amount of sulfur, the less the swine will consume.

The predetermined amount of feed consumption or intake is that amount which is necessary for proper weight maintenance. The predetermined amount of intake will accordingly vary, depending on the type of swine, the composition of the feed and the environmental conditions under which they are maintained. However, it may generally be considered that a preferred feed intake limitation for swine is from about 2 to 8 pounds of feed per head per day, and that a preferred range of sulfur for providing such intake is from about 0.25% to about 2% by weight of the other ingredients. An especially preferred range of sulfur is from 0.5% to 1.0%. Nevertheless it should be remembered that the intake limiting capability of sulfur is still effective at percentages greater than 2%, if a greater degree of intake limitation (less than 2 pounds/head/day) is desired.

The method of manufacturing this feed intake limiting composition, like the composition itself, is subject to wide variation. Generally, the sulfur is mixed thoroughly with the feed ingredients in an amount of from about 0.25 to 2% by weight of the other ingredients. The specific variations in this procedure depend upon the form of elemental sulfur utilized. Flowers of sulfur, an especially preferred embodiment of this invention can be added to the other feed ingredients by any conventional dry blending technique for forming a meal, an agglomeration, or a pelleted ration. Gaseous sulfur can be purged into the feed ingredients at sufficient temperatures and pressures to avoid degradation of the feed constituents. Likewise the procedure can be varied to allow for slurrying or solubilization of the feed ingredients and liquid sulfur under conditions sufficient to avoid degradation, deterioration or denaturing of the feed ingredients.

Alternatively, the sulfur can be sprayed, dusted or otherwise coated onto the surface of the feed.

Another important variation in this procedure involves manufacture of an intake limiting supplement, concentrate or premix. In accordance therewith, the sulfur may be mixed or blended with certain nutritious material and/or other carrier, such as cellulose, starch, etc. in a more concentrated amount than is necessary for effective feed intake limitation. If sold in such form, it can later be added to a full ration of other feed ingredients by the farmer or rancher. Alternatively, the premix can be further blended by the manufacturer, wholesaler, distributor or retailer.

This invention will be better illustrated by the following example which is not in any way intended to limit the discovery.

EXAMPLE 1

Forty-four sows, all in gestation, were fed rations of Ralston Purina's sow Chow Ovals over a nine week period. The sows were fed in five groups (A, B, C, D and E) consisting of eight sows in each group, except group D which had twelve. Groups A - D had various amounts of flowers of sulfur added to their ration. Group A's ration contained 2.0% added sulfur, Group B had 1.5%, Group C had 1.0%, Group D had 0.75% and Group E had 0.0% added sulfur. An average daily weight gain of one pound per head per day was the target. Accordingly, it was predetermined that the sows should consume approximately five pounds per head per day. Group E, the control group, had to be hand fed the five pounds each day to maintain the desired average weight gain. The other groups were allowed to eat ad libitum, in order to determine the feed intake limiting effect of the sulfur when used in conjunction with Sow Chow Ovals. The results are listed on attached Table I. As can be seen from Table I, use of 2.0% sulfur restricted the intake of the sows to between one and two pounds of feed per head per day, wherein use of 0.75% sulfur restricted intake at an average of about six pounds of feed per head per day. These can be extrapolated to show that between 0.75% and 1.0% sulfur would restrict the intake to about 5 pounds per head per day as desired for Sow chow Ovals.

TABLE I

|  | Group A | Group B | Group C | Group D | Group E |
| --- | --- | --- | --- | --- | --- |
| Sulfur % Added (based on the amount of other ingredients in the feed) | 2.0 | 1.5 | 1.00 | 0.75 | 0.0 |
| Average Initial Weight | 201.5 | 201.8 | 201.5 | 200.7 | 202.0 |
|  | AVERAGE DAILY GAIN AND AMOUNT OF FEED CONSUMED | | | | |
| 0 – 1 week | −1.64 | −1.09 | −0.14 | −0.06 | −1.06 |
| (lbs. feed consumed/hd./ da.) | (1.20) | (1.75) | (3.30) | (4.06) | (5.00) |
| 1 – 2 weeks | −0.78 | −0.34 | 0.08 | 0.83 | 0.80 |
| (lbs. feed consumed/hd./da.) | (1.50) | (2.48) | (3.52) | (4.69) | (4.93) |
| 2 – 3 weeks | −0.34 | 0.27 | 0.90 | 2.37 | 0.24 |

TABLE I-continued

|  | Group A | Group B | Group C | Group D | Group E |
|---|---|---|---|---|---|
| (lbs. feed consumed/hd./da.) | (1.46) | (2.92) | (4.52) | (6.06) | (5.00) |
| 3 – 5 weeks | −0.22 | 0.34 | 0.78 | 1.07 | 1.24 |
| (lbs. feed consumed/hd./da.) | (1.54) | (3.06) | (4.56) | (6.03) | (5.00) |
| 5 – 7 weeks | −0.02 | 0.66 | 1.12 | 2.08 | 0.74 |
| (lbs. feed consumed/hd./da.) | (2.19) | (4.12) | (5.58) | (7.73) | (5.00) |
| 7 – 9 weeks | +0.07 | 0.48 | 1.11 | 1.19 | 1.28 |
| (lbs. feed consumed/hd./da.) | (2.02) | (3.72) | (5.32) | (5.67) | (5.00) |

What is claimed is:

1. A feed for swine comprising grain, protein, vitamin and mineral components, suitable for controlling feed intake to between about 2 to 8 pounds per head per day, further comprising as an added essential ingredient an amount of elemental sulfur effective to so control intake of the feed.

2. The composition of claim 1 wherein the amount of sulfur is at least about 0.25% by weight of the other ingredients.

3. The composition of claim 1 wherein the amount of sulfur is between about 0.25 to 2.0% by weight of the other ingredients.

4. The composition of claim 1 wherein the amount of sulfur is between about 0.75 to 1.0% by weight of the other ingredients.

5. The composition of claim 4 wherein the feed is suitable for controlling intake at about 5 pounds per head per day.

6. The composition of claim 1 wherein the elemental sulfur is flowers of sulfur.